E. W. SHEPHARD.
CHURN.

No. 175,383. Patented March 28, 1876.

WITNESSES:
Francis McArdle
John Goethals

INVENTOR:
E. W. Shephard
BY
ATTORNEYS.

UNITED STATES PATENT OFFICE.

EDWARD W. SHEPHARD, OF WILMINGTON, OHIO.

IMPROVEMENT IN CHURNS.

Specification forming part of Letters Patent No. 175,383, dated March 28, 1876; application filed January 22, 1876.

*To all whom it may concern:*

Figure 1:
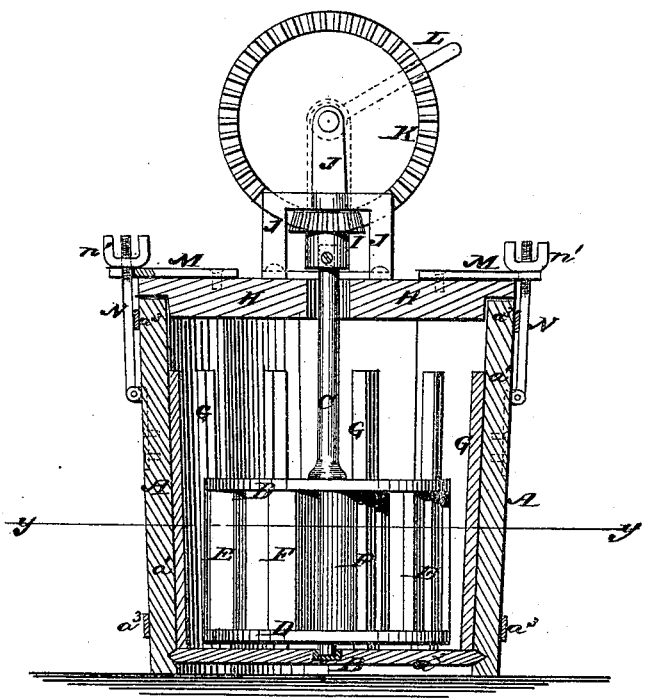
Figure 2:
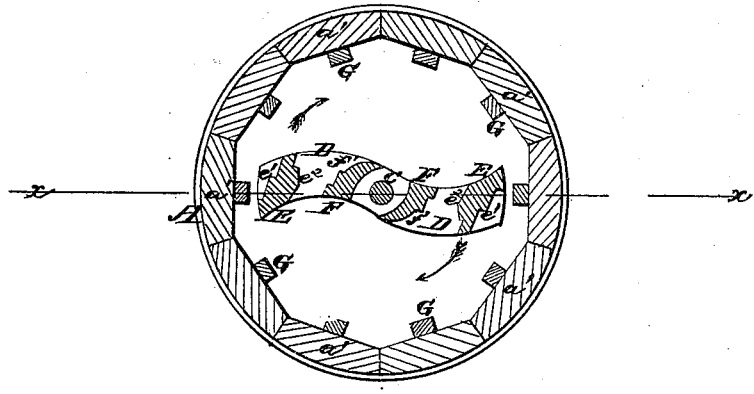

Be it known that I, EDWARD WILLIAM SHEPHARD, of Wilmington, in the county of Clinton and State of Ohio, have invented a new and useful Improvement in Churning Apparatus, of which the following is a specification:

Figure 1 is a vertical section of my improved churn, taken through the line $x\ x$, Fig. 2. Fig. 2 is a horizontal section of the same, taken through the line $y\ y$, Fig. 1.

Similar letters of reference indicate corresponding parts.

The object of this invention is to furnish an improved churning apparatus, simple in construction, inexpensive in manufacture, convenient in use, easily operated, and effective in operation, and, at the same time, strong and durable, and not liable to get out of order.

The invention will first be described in connection with drawing, and then pointed out in the claim.

A represents the body of the churn, which is formed of ten equal staves, $a^1$, held together and to the bottom $a^2$ by hoops $a^3$. The staves $a^1$ are made flat upon their inner sides, which makes the inner surface of the churn a decagon, as shown in Fig. 2. In the center of the bottom of the churn A is secured a socket, B, to receive the lower end of the dasher-shaft C, or a journal formed upon or attached to said end. The socket B is made of anti-friction metal, to diminish friction and wear and prevent the discoloration of the milk or butter from rust. To the lower part of the dasher-shaft C are rigidly attached two parallel cross-bars, D. The forward side of each arm of the cross-bars D is formed with a convex curve, and its rear side is formed with a concave curve, as shown in Fig. 2. To and between the ends of the cross-bars D are secured two upright paddles, E, which are placed with their forward edges inclined inward. Upon the outer sides of the paddles E are formed two or more rabbets, shoulders or steps, $e^1$, and upon their inner sides are formed one or more rabbets or inclines, $e^2$. To and between the cross-bars D, near the shaft C, are secured two upright paddles, F, which are placed with their forward edges inclined inward. Upon the outer sides of the paddles F are formed two or more rabbets, shoulders, or steps, $f'$, and their inner sides are concaved, as shown in Fig. 2.

With this construction when the dasher is revolved the milk will be thoroughly intermingled and thrown into violent agitation, bringing the butter in a very short time. The angles between the staves of the churn-body A break up the currents of milk that are thrown against and tend to sweep around the wall of the churn-body, which operation is assisted and made more effective by upright ribs G, attached to the middle parts of the staves, as shown in Fig. 2.

The upper end of the dasher-shaft C passes up through a hole in the center of the churn-cover H, and to it is attached the hub of a bevel-gear wheel, I, the journal of which revolves in a socket in the frame or bracket J, attached to one of the parts or halves of the churn-cover H. The teeth of the gear-wheel I mesh into the teeth of a large bevel-gear wheel, K, the journals of which revolve in bearings in the frame J, and to one of said journals is attached the crank L, by which the dasher is operated. The part or half of the cover H to which the frame J is attached has stops M attached to its upper side near the ends of its straight edge, the ends of which project and are slotted to receive the bars N. The lower ends of the bars N are hinged to the sides of the churn-body A, and have screw-threads cut upon their upper ends to receive the hand-nuts $n'$, by which they are clamped to the straps M after they have been swung into the slots of said straps. The other part or half of the cover H is loose, so that it can be taken off to inspect the progress of the churning.

Having thus described my invention, I claim as new and desire to secure by Letters Patent—

The combination of parallel concavo-convex bars D D, outer vertical paddles E, having shoulders $e^1$ and inclines $e^2$, and the inner vertical paddles F, having steps $f'$, with the stationary ribs G on the inside of churn, as and for the purpose specified.

EDWARD W. SHEPHARD.

Witnesses:
CHAS. B. DWIGGINS,
J. W. BALLARD.